(12) United States Patent
Pham

(10) Patent No.: US 12,286,925 B2
(45) Date of Patent: Apr. 29, 2025

(54) ANCILLARY UNIT DRIVE FOR A VEHICLE

(71) Applicant: MAN Truck & Bus SE, Munich (DE)

(72) Inventor: Haison Pham, Munich (DE)

(73) Assignee: MAN Truck &Bus SE, Munich (DE)

( * ) Notice: Subject to any disclaimer, the term of this patent is extended or adjusted under 35 U.S.C. 154(b) by 0 days.

(21) Appl. No.: 18/290,104

(22) PCT Filed: May 6, 2022

(86) PCT No.: PCT/EP2022/062332
§ 371 (c)(1),
(2) Date: Nov. 9, 2023

(87) PCT Pub. No.: WO2022/238261
PCT Pub. Date: Nov. 17, 2022

(65) Prior Publication Data
US 2024/0247609 A1    Jul. 25, 2024

(30) Foreign Application Priority Data

May 10, 2021 (DE) .......................... 102021112162.0

(51) Int. Cl.
 *F02B 67/06* (2006.01)
 *F16H 7/02* (2006.01)
 (Continued)

(52) U.S. Cl.
CPC .............. *F02B 67/06* (2013.01); *F16H 7/02* (2013.01); *F16H 7/12* (2013.01); *F16H 2007/0865* (2013.01)

(58) Field of Classification Search
CPC ...... F02B 67/06; F02B 2275/06; F16H 55/36; F16H 7/02; F16H 7/12; F16H 2007/0865
(Continued)

(56) References Cited

U.S. PATENT DOCUMENTS 2,526,242 A * 10/1950 La Salle ................... F16H 7/02
474/89
2,903,083 A * 9/1959 Kelley .................... F02B 67/06
62/133
(Continued)

FOREIGN PATENT DOCUMENTS

DE         1990137 U      7/1968
DE       10200686 A1      8/2002
(Continued)

OTHER PUBLICATIONS

German Search Report issued in German Patent Application No. 102021112162.0 dated Sep. 20, 2021. English translation not avialable.

(Continued)

*Primary Examiner* — Henry Y Liu
(74) *Attorney, Agent, or Firm* — Weber Rosselli & Cannon LLP

(57) ABSTRACT

The invention relates to an auxiliary unit drive for a vehicle and to a motor vehicle having such an auxiliary unit drive. The auxiliary unit drive (1) for a vehicle comprises a plurality of auxiliary units (2, 2a, 2b), a first belt (3) arranged in a first belt plane (15) and in driving connection with the plurality of auxiliary units (2, 2a, 2b). The auxiliary unit drive (1) further comprises a second belt (4) arranged in a second belt plane (16) offset parallel to the first belt plane (15) and in driving connection with only a part (2a) of the plurality of auxiliary unit drives (2, 2a, 2b), preferably for increasing the torque transmitted to the part (2a) of the plurality of auxiliary unit drives (2, 2a, 2b). The auxiliary unit drive (1) further comprises a driving shaft (5) that is in driving connection with the first and second belts (3, 4) via two driving belt tracks (7, 8) that are arranged in a rotationally fixed manner relative to each other.

17 Claims, 2 Drawing Sheets

Figure 1:
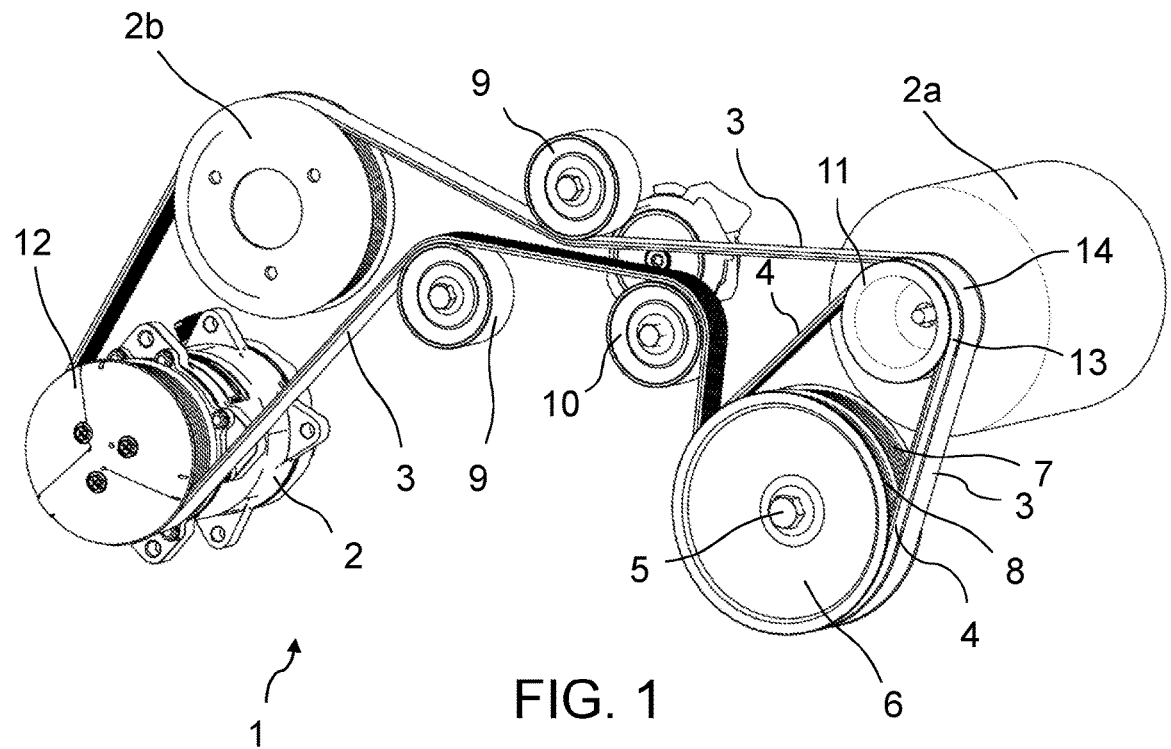

(51) Int. Cl.
*F16H 7/08* (2006.01)
*F16H 7/12* (2006.01)

(58) Field of Classification Search
USPC .................................................. 474/86, 87
See application file for complete search history.

(56) References Cited

U.S. PATENT DOCUMENTS

| | | | | | |
|---|---|---|---|---|---|
| 2,909,074 | A * | 10/1959 | Scheiterlein | ............ | F16H 7/14 123/195 A |
| 2,910,891 | A * | 11/1959 | Heckethorn | ............ | F01P 7/046 474/169 |
| 3,059,493 | A * | 10/1962 | Wolfram | ................ | F01P 7/085 74/336.5 |
| 3,444,748 | A * | 5/1969 | Sutaruk | ................... | F01P 7/042 192/48.92 |
| 3,924,483 | A * | 12/1975 | Walker | ................... | F02B 67/06 474/86 |
| 4,296,717 | A * | 10/1981 | Schlagmuller | ......... | F02B 67/06 123/195 A |
| 4,502,345 | A * | 3/1985 | Butterfield | ............. | F01P 7/046 474/69 |
| 4,662,861 | A * | 5/1987 | Seung | ..................... | F02B 67/06 192/48.92 |
| 4,846,768 | A * | 7/1989 | Kitami | ..................... | F16H 9/04 474/86 |
| 4,969,857 | A * | 11/1990 | Kumm | ................ | F16H 61/6624 474/49 |
| 5,085,199 | A * | 2/1992 | Sado | ....................... | F02B 67/10 123/198 R |
| 5,112,281 | A * | 5/1992 | Minato | ................ | F16H 7/1263 474/84 |
| 5,342,248 | A * | 8/1994 | Matsubara | ............. | F02B 67/10 474/18 |
| 5,415,592 | A * | 5/1995 | Hoyt | ..................... | F16H 55/171 474/85 |
| 5,700,212 | A * | 12/1997 | Meckstroth | ............ | F02B 67/04 474/69 |
| 5,722,909 | A * | 3/1998 | Thomey | ................. | F02B 67/06 474/89 |
| 5,909,075 | A * | 6/1999 | Heimark | ................ | F02B 67/06 474/86 |
| 7,216,621 | B2 * | 5/2007 | Pigott | .................... | F02B 67/06 123/195 A |
| 7,798,928 | B2 * | 9/2010 | Serkh | ...................... | F02B 67/06 474/70 |
| 8,251,164 | B2 * | 8/2012 | McGee | .................. | F02N 15/02 180/65.6 |
| 8,313,400 | B2 * | 11/2012 | Serkh | ...................... | F16H 55/36 474/69 |
| 8,408,188 | B1 * | 4/2013 | Hormilla | ................. | F02B 33/32 474/166 |
| 8,689,757 | B2 * | 4/2014 | Lee | ......................... | F02N 15/08 123/179.25 |
| 8,808,124 | B2 * | 8/2014 | Major | ................... | B60K 25/00 180/65.265 |
| 9,169,904 | B2 * | 10/2015 | Graves | .................. | B60K 25/02 |
| 10,161,374 | B2 * | 12/2018 | Serkh | ..................... | F02N 11/04 |
| 11,376,943 | B1 * | 7/2022 | Smith | ...................... | B60K 6/48 |
| 11,441,481 | B2 * | 9/2022 | Farhat | ................... | F16H 55/36 |
| 11,725,575 | B2 * | 8/2023 | Vaughn | ................. | B60K 25/02 123/90.31 |
| 2002/0182063 | A1 * | 12/2002 | Edsinger | ................ | F04D 25/02 415/124.2 |
| 2008/0318729 | A1 * | 12/2008 | Asao | ...................... | B60K 6/485 477/5 |
| 2009/0233743 | A1 * | 9/2009 | Leiss | ...................... | F04B 17/06 474/237 |
| 2009/0266097 | A1 * | 10/2009 | Hamilton | ............ | B60H 1/3222 62/236 |

FOREIGN PATENT DOCUMENTS

| | | |
|---|---|---|
| DE | 102005023878 A1 | 12/2005 |
| DE | 102009003784 A1 | 10/2010 |
| DE | 102017203295 A1 | 9/2018 |
| WO | 2007108887 A1 | 9/2007 |

OTHER PUBLICATIONS

International Search Report and Written Opinion issued in PCT/EP2022/062332 dated Jul. 28, 2022. English translation not available.

* cited by examiner

ANCILLARY UNIT DRIVE FOR A VEHICLE

CROSS-REFERENCE TO RELATED APPLICATIONS

This application is a 371 application of PCT/EP2022/062332 filed May 6, 2022 which claims benefit of and priority to German Patent Application Serial No. DE102021112162.0 filed May 10, 2021, the disclosures of the above-identified applications are hereby incorporated by reference in their entirety.

The invention relates to an auxiliary unit drive unit for a drive engine and to a motor vehicle having such an auxiliary unit drive unit.

In practice, it is known to drive auxiliary units via an auxiliary unit drive. For example, auxiliary units or power consumers in general, such as pumps or generators for producing electricity, are driven via a belt. For this purpose, the belt is driven by a drive wheel or driving belt wheel, which in vehicles with an internal combustion engine is attached to one end of a crankshaft of the internal combustion engine in a rotationally fixed manner or can be driven indirectly by a crankshaft.

The belt and its physical properties, such as the belt width, are configured so that all auxiliary units can be supplied with sufficient power. For this purpose, the auxiliary unit or power consumer that takes up the greatest load is used as a reference. For all other auxiliary units, however, this design of the belt is at best just suitable or clearly oversized if they have to absorb significantly lower loads.

It is thus an object of the invention to provide an improved auxiliary unit drive with which disadvantages of conventional auxiliary unit drives can be avoided.

This object is solved by an auxiliary unit drive with the features of independent claim 1. Advantageous further embodiments are indicated in the dependent claims and the description.

According to a first general aspect of the invention, an auxiliary unit drive for a drive engine and/or a vehicle is provided. The auxiliary unit drive is a device for driving auxiliary components of a motor vehicle. In one embodiment, the auxiliary unit drive may be the auxiliary unit drive of an internal combustion engine for a motor vehicle. According to the invention, the ancillary unit drive comprises a plurality of ancillary units, which may also be referred to as power consumers.

The auxiliary unit drive further comprises a first belt disposed in a first belt plane and in driving connection with the plurality of auxiliary unit drives.

The auxiliary unit drive further comprises a second belt arranged in a second belt plane offset parallel to the first belt plane and in driving connection with only a portion of the plurality of auxiliary unit drives, preferably to increase the torque transmitted to the portion of the plurality of auxiliary unit drives. The auxiliary unit drive further comprises a driving shaft that is in driving connection with the first and second belts via two driving belt tracks that are arranged in a rotationally fixed relationship with respect to each other.

Thus, in order to increase the transmittable power within a belt drive with multiple power consumers (auxiliary units) only partially for a certain power consumer or a part of the power consumers, an additional (second) belt is tensioned between the power drive and this one consumer or this part of the power consumers, so that this one power consumer or this part of the power consumers is driven by both the first belt and the second belt.

This offers the advantage that a drive power of the part of the multiple auxiliary units can be increased without having to increase the potentially transmittable power for all auxiliary units, although they do not take more load than originally intended. This means that more power can be specifically converted for some of the auxiliary units, in particular the transmitted torque can be increased, while the bearing and belt loads for the other auxiliary units (power consumers) within the overall belt drive remain unchanged.

This approach is particularly advantageous if an additional auxiliary unit has to be integrated into an existing belt drive which has a higher power requirement than the previous ones, i.e. to which a higher torque has to be transmitted. The same applies if, in an existing belt drive, an existing auxiliary unit or some of the auxiliary units have to be replaced by auxiliary units with higher power requirements.

Another advantage is that the use of two belts increases the service life of the first belt, which can also be referred to as the base belt drive. The second belt advantageously absorbs vibrations, which are thus conducive to extending the service life of the first belt.

A belt plane is understood to be the spatial area in which the respective belt runs or in which the respective belt moves. The belt plane can also be referred to as the drive plane. Since the second belt plane is offset parallel to the first belt plane, it follows that the first belt cannot wrap around the second belt in a partial region or that the second belt cannot wrap around the first belt in a partial region. Instead, the second belt is offset from the first belt in a direction perpendicular to the parallel belt planes.

In one embodiment, only one of the multiple power take-offs may be in driving connection with the second belt. In other words, for only one particular power take-off (for one auxiliary unit), the transmittable power within the belt drive with multiple power take-offs is partially increased by tensioning the additional belt (second belt) between power drive and this one power take-off, so that this one power take-off is driven by both the first belt and the second belt. This offers the advantage that in case of a strong increase of a power take-off only one of the auxiliary units gets a part of the required power transmitted via a second belt, which exceeds the power provided by the first belt.

In a further embodiment of this embodiment, the second belt can wrap around only one driving belt wheel and one driven belt wheel. Accordingly, the second belt can be of particularly compact design. Furthermore, this makes it particularly easy to add a second belt to an existing auxiliary unit operation, so that all other belt pulleys, idlers, tensioning pulleys, etc. can remain unchanged.

A "driving belt wheel" is to be understood in particular as a belt wheel or also a belt pulley through which the torque is introduced into the auxiliary unit drive, preferably the belts. By "driven belt wheel" shall be understood in particular a belt wheel or also a belt pulley which is driven by means of the belt by the driving belt wheel or also driving belt pulley. Wrap around" is to be understood in particular as a direct contact on an outer contour, preferably an outer contour of a belt wheel or belt pulley.

The auxiliary unit coupled to the second belt can be an electric machine that can be operated as a generator. For example, the power supply requirements for vehicles have been increasing steadily in recent years, with the result that a generator has to meet increasingly high power requirements in order to supply the growing number of electronic components. With the approach according to the invention, a generator in a conventional auxiliary unit can thus be replaced by a more powerful generator with little effort and driven in a manner appropriate to its performance.

In another embodiment, the second belt may be a self-tensioning belt.

A self-tensioning belt is understood to mean that, for a belt tension which is necessary for a transmission of torques, no additional element is used which additionally stretches and/or tensions the belt in order to generate or maintain a desired belt tension, but that the self-tensioning belt is already tensioned during installation due to its material properties in such a way that it maintains the tension generated during installation. Self-tensioning belts are also known under the terms "elasto-belt" or "stretchy-belt" and are commercially available.

The self-tensioning belt offers the advantage that radial center distances between the driving shaft and the part of the multiple auxiliary units can be very short, because no additional rolling element, as used in non-self-tensioning belts as a tensioning means, has to be in contact with the self-tensioning belt.

Accordingly, the second belt may not partially wrap around a tensioner pulley and/or no belt tensioner may be provided to tension the second belt. This offers the advantage that an efficiency of the auxiliary unit operation is increased due to fewer rolling contacts and thus less friction. This further offers the advantage that additional installation space is saved, weight is reduced and no maintenance-intensive mechanics are installed for the second belt. A belt tensioner fulfills the purpose of tensioning a belt. A tensioner is a pulley that induces a defined elongation in a belt by means of a tensioning device so that the belt always has the same tension and can therefore transmit the same forces, even though a belt elongates over time.

In a further embodiment, the auxiliary unit drive may further comprise a driving pulley rotatably connectable and/or rotatably connected to the driving shaft, which is configured as a double belt pulley, comprising a first driving belt track on which the first belt engages, and a second driving belt track on which a second belt engages. A double belt pulley is understood to be a belt pulley on which two belt tracks are applied radially, on each of which a belt can engage.

A double pulley enables a structurally particularly compact arrangement of two belts running in parallel offset belt planes. The driving belt tracks can be configured in such a way that they have a surface adapted to a respective belt used for each track, which is suitable for optimum power transmission for the respective belt. Furthermore, the belt tracks can be configured to prevent axial "wandering" of the belts during operation, so that the first and second belts cannot overlap or rub against each other at edge areas.

In an alternative embodiment, the auxiliary unit drive may further comprise a driving first pulley rotatably connectable to the driving shaft and disposed in the first belt plane, comprising a first driving belt track on which the first belt engages. In addition, the auxiliary unit drive may have a driving second pulley rotatably connectable to the driving shaft, arranged in the second belt plane and coaxial and non-rotatable to the driving first pulley, having a second driving belt track on which the second belt engages. Instead of a double pulley, two axially spaced conventional pulleys are thus used.

This offers the advantage that individual pulleys are less costly to produce. In addition, this offers the possibility, if desired and necessary, to easily retrofit additional pulleys if more than two belts are needed.

In a further embodiment, a diameter of the two driving belt tracks arranged fixed in rotation relative to each other can be the same. The diameter is specified in such a way that the belts of the two belt tracks actually have the same running speed. This is advantageous because, for example, V-belts can have different radial dimensions than flat belts. This also results in different points of force application between pulley and belt. For example, in the case of V-belts, power is not transmitted directly at the base of the belt track. The belt track bottom is the surface of a belt track that is formed radially closest to a center of rotation and is usually flat. In fact, the power transmission of a V-belt takes place on the belt flanks, which are slightly raised from the belt track base. However, a flat belt would rest on the bottom of the belt track and therefore experience a slower running speed than a V-belt if the bottom of the belt track were decisive for a diameter.

Furthermore, an equal diameter and thus an equal running speed of the two belts is advantageous in order to prevent continuous slippage between the driving pulley and the driven pulley on which two belts engage.

In a further embodiment, the part of the multiple auxiliary units that is in drive connection with the second belt can each be in drive connection with the first and second belts via two driven belt tracks arranged in a rotationally fixed manner relative to one another. Here again, two embodiment variants are conceivable. In a first embodiment, the two driven belt tracks arranged fixedly in terms of rotation relative to one another can be provided by a driven double belt pulley, and in a second embodiment, they can be provided by two coaxially arranged driven belt pulleys.

In a further embodiment, a diameter of the two driven belt tracks arranged rotationally fixed to each other can be the same. This offers the advantage that there is no difference in rotational speed or slip between two engaging belts and thus no power is lost due to friction and thus waste heat. Furthermore, an auxiliary unit that is in driving connection with both the first and second belts can be driven by the first belt and the second belt at the same speed.

In a further embodiment, the second belt can be configured as a V-ribbed belt. The advantage of a V-ribbed belt is that it represents a further development of the V-belt and combines the advantages of the flat belt (small radii) with those of the V-belt (smaller wrap angles necessary for a constant transmissible power or greater friction with a constant wrap angle). The V-ribbed belt has ribs that run in the longitudinal direction. The wrap angle indicates the contact area in angular degrees in which one flexible component encloses another.

The invention further includes the following aspects:

The auxiliary unit drive can be supplied by the internal combustion engine with the power required to drive auxiliary units. In a preferred embodiment, the internal combustion engine is a reciprocating internal combustion engine. The vehicle may be a commercial vehicle, for example a truck. The internal combustion engine may also be referred to hereinafter as the engine. The auxiliary units driven by the auxiliary unit drive may comprise a generator-driven electric machine, for example an alternator, a lubricant pump, a hydraulic pump (for example for power steering), a cooling water pump, a fuel pump, an injection pump, a metering pump, a fan for the radiator, a compressor for an air-conditioning system, an air brake or for charging the engine, a turbocharger, or a brake booster.

The term "belt" is intended to mean in particular an endless looping means made of an elastic material, such as fabric, leather, plastic, mixtures of plastic and carbon or carbon fibers, plastic with embedded metal reinforcements or all common design forms of belts, which is provided for transmitting rotary movements. The belt is preferably configured without joints. The belt preferably has surface characteristics suitable for high transmissibility of torque before the belt slips off a surface because a transmissible (frictional) power has been exceeded. The first belt can be a V-ribbed belt, a flat belt, a double V-belt, a compound V-belt and all other known and common belt types. The second belt may comprise any belt type that the first belt may comprise, wherein the first belt and the second belt may be of the same or different belt type.

The driving shaft can in turn be driven directly or indirectly by a crankshaft or can also be an extension of a crankshaft. The driving shaft can be configured as a shaft journal and/or have a shaft hub.

The invention further relates to a motor vehicle comprising an auxiliary unit drive according to the disclosures herein. Particularly preferably, the motor vehicle is a commercial vehicle. In this case, the motor vehicle may be, in other words, a motor vehicle configured by its construction and equipment to carry passengers, to carry goods, or to tow trailer vehicles. For example, the motor vehicle may be a truck, a bus, and or a tractor-trailer that is at least partially electrically powered.

Figure 2:
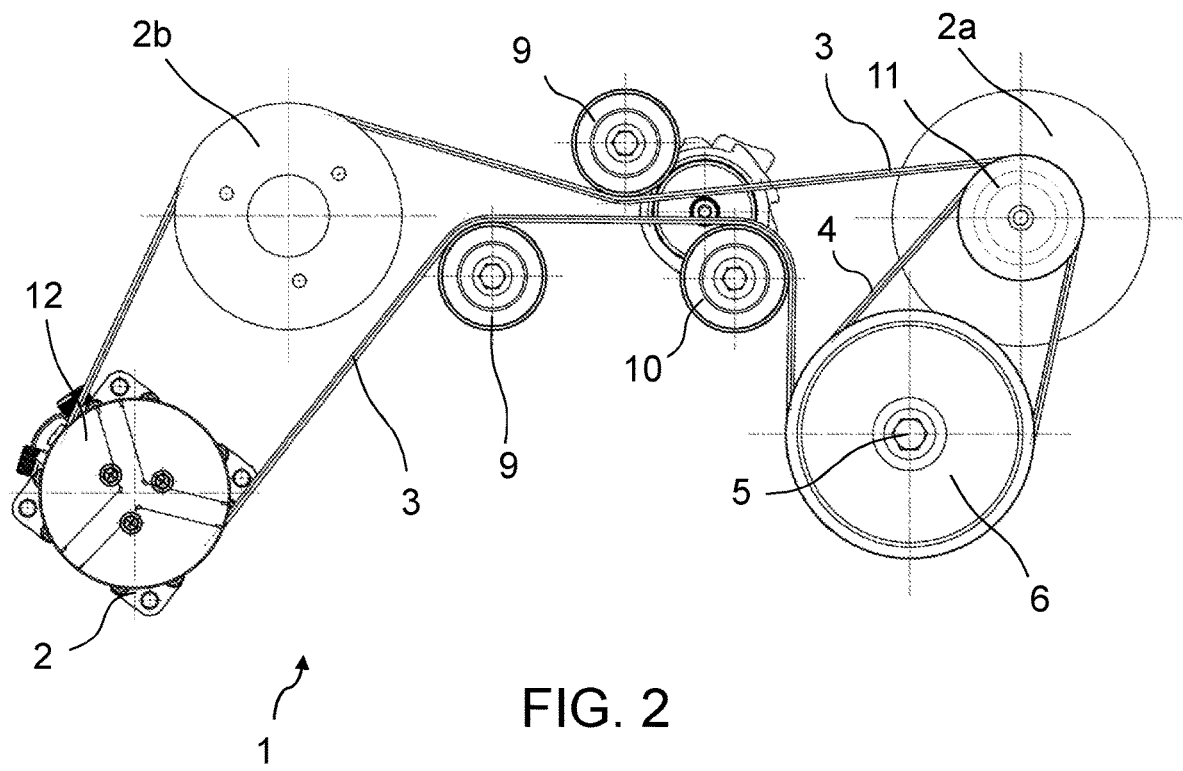
Figure 3:
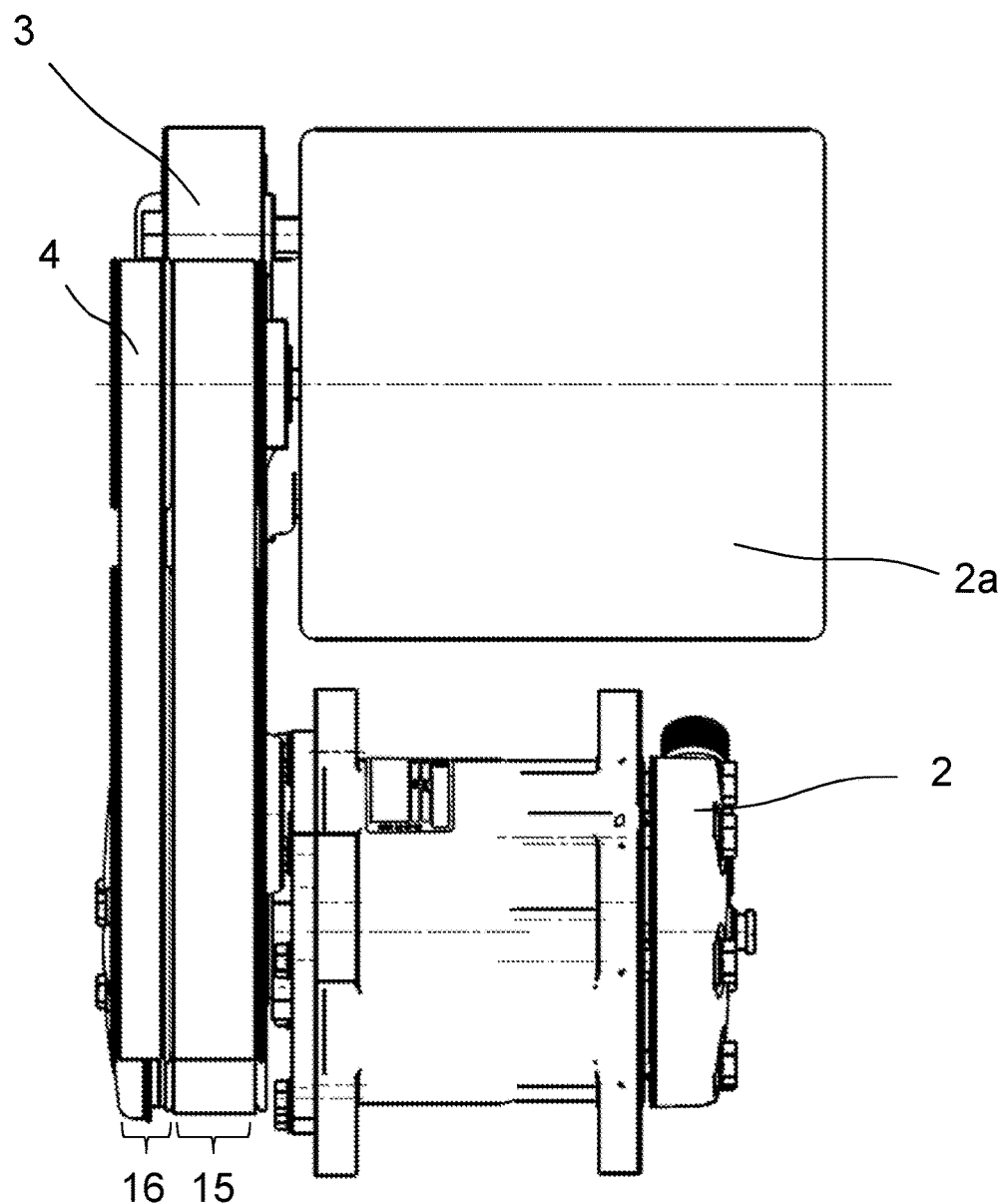

The preferred embodiments and features of the invention described above can be combined with each other as desired. Further details and advantages of the invention are described below with reference to the accompanying figures. Showing:

FIG. 1 A perspective view of an auxiliary unit operation;
FIG. 2 A top view of an auxiliary unit operation;
FIG. 3 side view of an auxiliary unit drive.

FIG. 1 shows a perspective view of an auxiliary unit drive 1, as it may be configured in an exemplary manner. The depicted auxiliary unit drive 1 is driven by an internal combustion engine (not shown) and comprises, by way of example, three auxiliary units 2, 2a, 2b, a first belt 3 and a second belt 4. The belts 3, 4 are driven by a driving belt pulley 6.

Furthermore, in this embodiment, the second belt 4 is only in drive connection with one auxiliary unit 2a of the three auxiliary units 2. This additionally increases the transmittable torque that can be transmitted to this one auxiliary unit 2a by the power that is only provided by the second belt. In other words, the power that the auxiliary unit 2a can take off is thus increased.

The first belt 3 is arranged in a first belt plane 15 and is in drive connection with the multiple auxiliary units 2, 2a, 2b. The second belt 4 is arranged in a second belt plane 16, which is offset parallel to the first belt plane 15. This can be seen even more clearly in FIG. 3.

Furthermore, the auxiliary unit drive 1 comprises a driving shaft 5 which is in driving connection with the first and second belts 3, 4 via two driving belt tracks 7, 8 which are arranged in a rotationally fixed manner relative to each other.

The auxiliary units 2, 2b, which are driven only by the first belt 3 but not by the second belt 4, are supplied with power via the two idler pulleys 9 and the belt tensioner 10 with a belt track on which the first belt 3 engages.

The driving belt tracks 7, 8 are arranged on a circumference of the driving belt wheel 6. In this embodiment example, the driving belt wheel 6 is configured as a double belt pulley. Thus, in this example, the driving belt wheel 6, also referred to as the driving belt pulley 6, comprises one component and not two composite components which are connected to each other in a rotationally fixed and coaxial manner.

As shown, the second belt 4 only wraps around the driving belt wheel 6 and the driven belt wheel 11, which is rotatably mounted on the auxiliary unit 2a.

The first belt 3 wraps around the driven belt pulleys 12 of the auxiliary unit 2, the driven belt pulley 2b and the driven belt pulley 11 of the auxiliary unit 2a. In addition, the first belt 3 wraps around two idler pulleys 9 and a tensioning pulley 10. The idler pulleys 9 increase the wrap angles that the belt 3 has to the driving pulley 6 and a driven pulley 12. The tensioning pulley 10 both increases a wrap angle of a driven pulley 12. Further, a belt tension of the first belt 3 is kept constant via a suitable tensioning device of the tensioning pulley 10. The larger a wrap angle is, the larger transmittable power is.

The second belt 4 is configured as a self-tensioning belt. This allows a very small radial center distance between the driving shaft 5 and the driven belt pulley 11, because no tensioning pulley 10 or generally a belt tensioner 10 is required, as in the case of the first belt 3, and this enables a saving in installation space.

As already described, the driving pulley 6 in this embodiment is configured as a double pulley. The double belt pulley comprises a first driving belt track 7, on which the first belt 3 engages and is guided, and a second belt track 8, on which the second belt 4 engages and is guided.

The belt tracks 7, 8 are axially spaced from each other so that the belts 3, 4 also run axially in parallel belt planes 15, 16. Alternatively, the double belt pulley could be configured as two individual belt pulleys, each of which has a belt track and could be mounted coaxially on the driving shaft 5 in a rotationally fixed manner (not shown here).

The diameter of the two driving belt tracks at which the force is applied to the belts 3, 4 is the same, so that this also results in the same running speed of the belts 3, 4.

The two belts 3, 4 drive the auxiliary unit 2a via the driven belt wheel 11 with two driven belt tracks 13, 14. In this embodiment, the driven belt wheel 11 is configured as a double belt pulley. Here, too, a design with two coaxially arranged driven belt pulleys is possible (not shown).

The diameter of the two driven belt tracks 13, 14 is the same, as for the driving belt tracks 7, 8, in relation to a power transmission from belts to a pulley, so that an almost slip-free power transmission via the two belts 3, 4 from the driving pulley 6 to the driven pulley 11 is possible.

In other words, with this constructive embodiment, the driven pulley 11 is driven at the same speed by first and second belts 3, 4.

In this embodiment, the two belts 3, 4 are configured as V-ribbed belts.

FIG. 2 shows the auxiliary unit drive 1 from FIG. 1 in plan view. The driving shaft 5, as in FIG. 1, is only partially visible: here only one end of the driving shaft is shown, which is attached to the center of the driving pulley 6. The extension of the driving shaft 5, which is not shown, can be a crankshaft or a gearbox that connects the driving shaft to a crankshaft in a power-transmitting manner.

FIG. 3 shows the auxiliary unit drive 1 in side view. The first belt 3 and the second belt 4 are clearly visible arranged next to each other and the belt planes 15 and 16 for the two belts 3, 4 are shown. The belts 3, 4 do not overlap at any point.

In summary, the second belt 4 enables the transmittable power or torque within a belt drive with multiple power consumers to be increased only partially for one particular power consumer, in this case the auxiliary unit 2a, since this one power consumer 2a is driven by both the first belt 3 and the additional belt drive 4. This ensures that the belt drive is not oversized and inefficient with respect to all other auxiliary units, in this case only auxiliary unit 2. Thus, the bearing and belt loads for all power consumers within the overall belt drive remain unchanged, but more power can be converted via the one power consumer 2a. To illustrate the approach according to the invention, only one example with three auxiliary units is described herein, but the auxiliary unit drive can obviously have more than three auxiliary units.

Although the invention has been described with reference to specific embodiments, it is apparent to one skilled in the art that various modifications may be carried out and equivalents may be used as substitutes without departing from the scope of the invention. Consequently, the invention is not intended to be limited to the disclosed embodiments, but is intended to encompass all embodiments that fall within the scope of the appended claims. In particular, the invention also claims protection for the subject matter and features of the subclaims independent of the referenced claims.

LIST OF REFERENCE SIGNS

1 Auxiliary unit operation
2, 2a, 2b Auxiliary unit
3 rd belt
4 second belt
5 driving shaft
6 driving pulley or belt wheel
7 first driving belt track
8 second driving belt track
9 Idler pulley
10 Tensioner pulley, belt tensioner
11 driven belt wheel with two belt tracks
12 driven belt wheel with one belt track
13 first driven belt track
14 second driven belt track
15 first belt level
16 second belt level

The invention claimed is:

1. An auxiliary unit drive for a drive engine comprising
   a) multiple auxiliary units;
   b) a first belt, which is arranged in a first belt plane and is in driving connection with the plurality of auxiliary units;
   c) a second belt arranged in a second belt plane, the second belt plane being offset parallel to said first belt plane and being in driving connection with only a part of said plurality of auxiliary units for increasing the torque transmitted to said part of said plurality of auxiliary units; and
   d) a driving shaft which is in driving connection with the first and the second belt via two driving belt tracks which are arranged in a rotationally fixed manner relative to one another.

2. The auxiliary unit drive of claim 1, wherein:
   the auxiliary unit drive for a drive engine is an auxiliary unit drive of an internal combustion engine for a motor vehicle; or
   the second belt is in driving connection with said part of said plurality of auxiliary units for increasing the torque transmitted to said part of said plurality of auxiliary units.

3. The auxiliary unit drive of claim 1, wherein only one of the plurality of auxiliary units is in driving connection with the second belt.

4. The auxiliary unit drive of claim 3, wherein the second belt loops around only a driving belt wheel and a driven belt wheel.

5. The auxiliary unit drive according to claim 1, wherein
   a) the second belt is configured as a self-tensioning belt; and/or
   b) the second belt does not partially wrap around a tensioning pulley, and/or
   c) no belt tensioner is provided for tensioning the second belt.

6. The auxiliary unit drive according to claim 1, further comprising a driving pulley rotatably connectable to the driving shaft, which is configured as a double pulley, comprising a first driving belt track on which the first belt engages, and a second driving belt track on which a second belt engages.

7. The auxiliary unit drive according to claim 1, further comprising
   a) a driving first belt pulley, which is arranged in the first belt plane, having a first driving belt track, on which the first belt engages, and which is rotatably connectable to the driving shaft, and
   b) a driving second belt pulley, which is arranged in the second belt plane, the second belt pulley being arranged coaxially and rotationally fixedly to the driving first belt pulley, the second belt pulley is rotatably connectable to the driving shaft and is comprising a second driving belt track on which the second belt engages.

8. The auxiliary unit drive according to claim 1, wherein a diameter of the two driving belt tracks which are arranged in a rotationally fixed manner relative to one another is the same.

9. The auxiliary unit drive according to claim 1, wherein the part of the plurality of auxiliary units which is in driving connection with the second belt is in driving connection with the first and the second belt in each case via two driven belt tracks arranged in a rotationally fixed manner relative to one another.

10. The auxiliary unit drive according to claim 6, wherein the two driven belt tracks arranged in a rotationally fixed manner relative to one another are provided by a driven double pulley or by two coaxially arranged driven pulleys.

11. The auxiliary unit drive according to claim 9, wherein a diameter of the two driven belt tracks arranged in a rotationally fixed manner relative to one another is the same.

12. The auxiliary unit drive according to claim 1, wherein an auxiliary unit in driving connection with both the first and second belts is driven by the first belt and the second belt at the same rotational speed.

13. The auxiliary unit drive according to claim 1, wherein the second belt is configured as a V-ribbed belt.

14. A motor vehicle comprising an auxiliary unit drive according to claim 1.

15. The motor vehicle of claim 14, wherein the motor vehicle is a commercial vehicle.

16. An auxiliary unit drive for a drive engine comprising
   a) multiple auxiliary units;
   b) a first belt, which is arranged in a first belt plane and is in driving connection with the plurality of auxiliary units;
   c) a second belt arranged in a second belt plane, the second belt plane being offset parallel to said first belt plane and being in driving connection with only a part of said plurality of auxiliary units for increasing the torque transmitted to said part of said plurality of auxiliary units; and d) a driving shaft which is in driving connection with the first and the second belt via two driving belt tracks which are arranged in a rotationally fixed manner relative to one another, wherein the part of the plurality of auxiliary units which is in driving connection with the second belt is in driving connection with the first and the second belt in each case via two driven belt tracks arranged in a rotationally fixed manner relative to one another.

17. An auxiliary unit drive for a drive engine comprising
a) multiple auxiliary units;
b) a first belt, which is arranged in a first belt plane and is in driving connection with the plurality of auxiliary units;
c) a second belt arranged in a second belt plane, the second belt plane being offset parallel to said first belt plane and being in driving connection with only a part of said plurality of auxiliary units for increasing the torque transmitted to said part of said plurality of auxiliary units; and
d) a driving shaft which is in driving connection with the first and the second belt via two driving belt tracks which are arranged in a rotationally fixed manner relative to one another,
wherein an auxiliary unit in driving connection with both the first and second belts is driven by the first belt and the second belt at the same rotational speed.

* * * * *